No. 853,256.
PATENTED MAY 14, 1907.
H. T. MONSON.
PLANTER.
APPLICATION FILED JUNE 4, 1906.
2 SHEETS—SHEET 1.
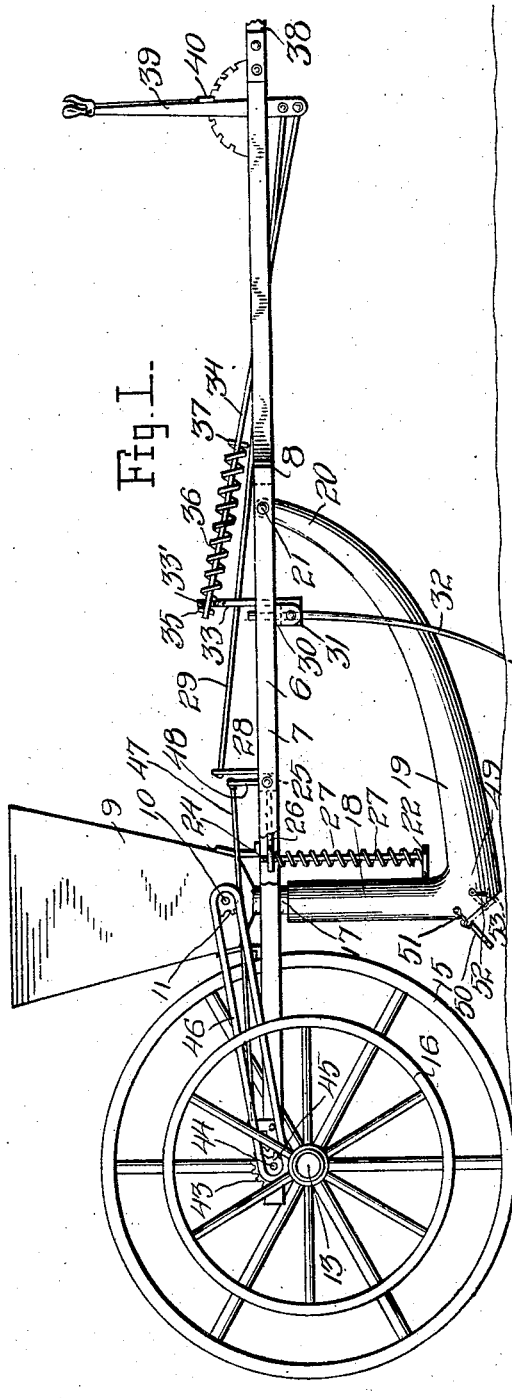
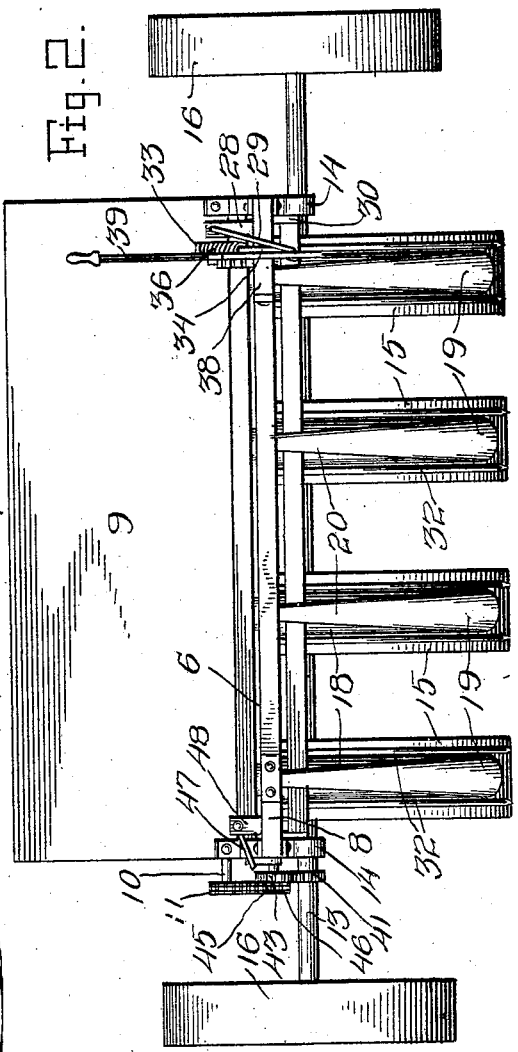

No. 853,256. PATENTED MAY 14, 1907.
H. T. MONSON.
PLANTER.
APPLICATION FILED JUNE 4, 1906.
2 SHEETS—SHEET 2.
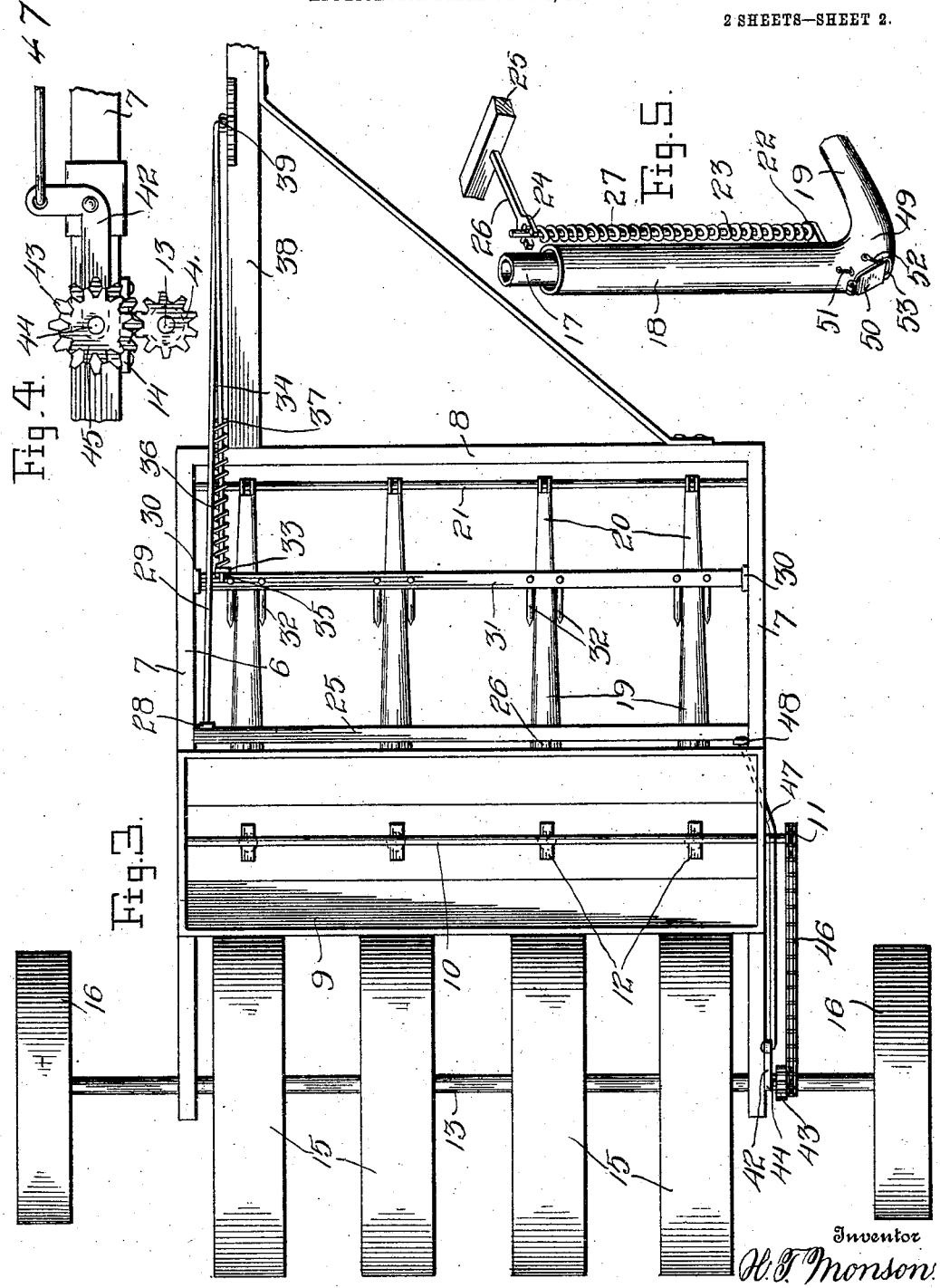

UNITED STATES PATENT OFFICE.

HENRY T. MONSON, OF MAYVILLE, NORTH DAKOTA.

PLANTER.

No. 853,256.    Specification of Letters Patent.    Patented May 14, 1907.

Application filed June 4, 1906. Serial No. 320,116.

*To all whom it may concern:*

Be it known that I, HENRY T. MONSON, a citizen of the United States, residing at Mayville, in the county of Traill, State of North Dakota, have invented certain new and useful Improvements in Planters; and I do hereby declare the following to be a full, clear, and exact description of the invention, such as will enable others skilled in the art to which it appertains to make and use the same.

This invention relates to farm machinery and more particularly to planters and has for its object to provide a planter which will include a novel arrangement of parts and which will include ground-treating teeth and drill shoes arranged to permit of upward movement thereof to pass obstructions in their paths.

Another object is to provide a planter including means for raising the shoes and ground-treating devices and means for throwing the dropping mechanism out of gear when these portions are raised.

It is to be understood that I do not desire to be limited to the exact details of construction shown and described, for obvious modifications will occur to a person skilled in the art.

In the drawings forming a portion of this specification and in which like numerals of reference indicate similar parts in the several views, Figure 1 is a side elevation of the present invention. Fig. 2 is a front view. Fig. 3 is a top plan view. Fig. 4 is an enlarged detail view of the shiftable gear. Fig. 5 is a detail perspective view, partly in section, showing one of the shoes and the connection with its yoke.

Referring now to the drawings, the present invention comprises a frame 6 including longitudinal sills 7 and a connecting front member 8. Mounted upon the sills at the rearward portions thereof, there is a transversely extending hopper 9 having an agitator shaft 10 provided with a sprocket 11 upon one end and equipped with agitating pins 12.

A transverse shaft or axle 13 is journaled adjacent to the rearward ends of the sills in brackets 14 which depend from the sills and mounted upon this shaft between the sills, there are a plurality of spaced presser wheels 15. The shaft 13 extends a considerable distance outwardly beyond the sills and has a wheel 16 of lesser diameter than the presser wheels mounted upon each end. It will thus be seen that any lateral tilting of the machine will bring these wheels 16 into engagement with the ground to prevent upsetting. Depending discharge pipes 17 are carried by the hopper 9 and extend into the upper ends of stocks or tubes 18 which are carried by furrow-opening shoes 19, these shoes having forwardly and upwardly extending draw straps 20 which are pivotally engaged with a transverse bar 21 secured in the sills adjacent to their forward ends. As will be seen, the arrangement is such that the shoes may be moved vertically at their rearward portions, the stocks 18 sliding upon the chutes 17.

Forwardly extending fingers 22 are carried by the stocks 18 adjacent to the shoes and secured to these fingers, there are upwardly extending rods 23 having cross pins 24 in their upper ends. A rock shaft 25 is mounted transversely in the sills forwardly of the stocks and carries a plurality of rearwardly extending yokes 26, these yokes having the rods 23 engaged therewithin and lying in position for engagement with the cross pins 24 when moved upwardly to raise the rods and therewith the shoes. Helical springs 27 surround the rods 23, resting at their lower ends against the fingers 22 and at their upper ends against the yokes 26, these springs thus holding the shoes yieldably against upward movement, independently of the yokes.

The rock shaft 25 carries an upwardly extending arm 28 to which there is connected an operating rod 29. Brackets 30 depend from the sills 7 between the shaft 25 and the bar 21, and in these brackets there is engaged a rock shaft 31 which carries a plurality of ground-treating teeth 32 which lie in pairs at opposite sides of the shoes 19, thus extending between the shoes, and the rock shaft 31 carries an upwardly extending arm 33 to which an operating rod 34 is connected for movement of the arm with respect to the rod. This is accomplished by passing the rod though an opening 33' in the arm 33 and passing a cross pin 35 through the rod beyond the arm. Forward movement of the rod thus results in forward movement of the arm to move the rock shaft 31 and bring the devices 32 out of engagement with the ground, and a helical spring 36 is engaged with the rod 34 between the arm 33 and the cross pin 37 engaged in the rod forwardly of the arm, this spring thus holding the arm yieldably against forward movement upon the rod but permitting of such movement to allow the devices 32 to be raised through engagement of objects in their paths.

A draft pole 38 is secured to the member 8 of the frame 6 and has pivoted thereupon a hand lever 39 to which the rods 29 and 34 are connected at one side of the pivot point of the lever, and means 40 is provided for holding the lever at different points of its movement so that the vertical position of the shoes and devices 32 may be varied. It will be seen from this arrangement that both the rock shafts 25 and 31 are moved simultaneously, by the lever 39.

A gear 41 is carried by the shaft 13 adjacent to one of the sills 7 and pivoted to this sill, there is a casting 42 carrying a gear wheel 43 journaled upon a stub shaft 44 and this casting is movable vertically upon its pivot to bring the gear 43 into and out of engagement with the gear 41. A sprocket wheel 45 is secured to the gear 43 concentrically therewith, and a chain 46 is engaged with this sprocket wheel and with the sprocket wheel 11, the agitating mechanism of the hopper being thus actuated by the shaft 13. A rod 47 is connected with the casting and is pivotally engaged in an upwardly extending finger 48 carried by the rock shaft 25, the arrangement being such that forward movement of the rod 47 results in upward movement of the casting 42 to move the gears out of engagement. It will thus be seen that through operation of the hand lever 39 the ground-treating devices 32, the shoes 19 and the agitating mechanism may be simultaneously moved into inoperative position.

As shown, each of the shoes 19 lies in the longitudinal plane of one of the presser wheels 15 so that the latter operate upon the ground treated by the shoes. The shoes, at their heel portions 49, are open as at 49' and pivoted doors 50 are provided for these openings, the pivot points being located at their upper ends. Catches 51 are provided to hold these doors in open position, when, as will be readily understood, the seed will be sown broadcast from the shoes. When the doors 50 are in closed position, in which they are held by catches 52, small openings 53 lie between the free ends of the doors and the ends of the openings 49' to admit of the egress of smaller quantities of seed.

What is claimed is:

1. In a planter, the combination with a frame, of depending ground-treating teeth connected with the frame for movement into and out of operative position, means for moving the teeth, said teeth being arranged for movement independently of the moving means, a spring arranged to hold the teeth yieldably against independent movement, furrow-opening shoes pivotally connected with the frame for vertical movement, means for moving the shoes upwardly, said shoes being arranged for movement independently of said moving means, springs arranged to hold the shoes against independent movement, seed-discharging mechanism, ground wheels for the frame, operative connections between the ground wheels and the seed-discharging mechanism, a throw out in said connections, and means for simultaneously operating the throw out and for moving the shoes and ground-treating teeth out of operative position.

2. In a mechanism of the class described, the combination with a frame, of vertically movable shoes mounted therein, a hopper, discharge mechanism for the hopper, a rock shaft, connections between the shoes and rock shaft for upward movement of the shoes when the shaft is moved in one direction, a wheeled shaft, a gear carried by said wheeled shaft, a casting pivoted to the frame, a gear journaled upon the casting and meshing with the gear of the shaft, said casting being movable upon its pivot to bring its gear out of engagement with that of the shaft, operative connections between the gear of the casting and the discharge mechanism of the hopper, and connections between the rock shaft and the casting for movement of the latter to bring the gears out of mesh when the rock shaft is moved to raise the shoes.

In testimony whereof, I affix my signature, in presence of two witnesses.

HENRY T. MONSON.

Witnesses:
C. V. EDWARDS,
C. J. SWEASY.